United States Patent [19]

De Jong

[11] Patent Number: 4,519,897

[45] Date of Patent: May 28, 1985

[54] FLUID CRACKING PROCESS USING SEPIOLITE-CONTAINING CATALYST COMPOSITION

[75] Inventor: Jan I. De Jong, Blaricum, Netherlands

[73] Assignee: AKZO nv, Arnhem, Netherlands

[21] Appl. No.: 563,475

[22] Filed: Dec. 20, 1983

[30] Foreign Application Priority Data

Dec. 27, 1982 [NL] Netherlands ............... 8205007

[51] Int. Cl.³ .............. C10G 11/05; C10G 55/06
[52] U.S. Cl. ........................ 208/74; 208/91; 208/120; 208/251 R
[58] Field of Search ......... 502/68; 208/120, 251 R, 208/251 H, 74, 91

[56] References Cited

U.S. PATENT DOCUMENTS

| | | | |
|---|---|---|---|
| 3,210,267 | 10/1965 | Plank et al. | 208/120 |
| 3,609,103 | 9/1971 | Gladrow et al. | 502/68 |
| 4,164,465 | 8/1979 | Gladrow | 208/120 |
| 4,196,102 | 4/1980 | Inooka et al. | 502/62 |
| 4,266,672 | 5/1981 | Van Nordstrand | 208/120 |
| 4,326,991 | 4/1982 | Asaoka et al. | 208/251 H |
| 4,439,312 | 3/1984 | Asaoka et al. | 208/210 |

*Primary Examiner*—Delbert E. Gantz
*Assistant Examiner*—O. Chaudhuri
*Attorney, Agent, or Firm*—Parkhurst & Oliff

[57] ABSTRACT

There is disclosed a process for cracking a metal-containing feed in the presence of a fluid cracking catalyst composition comprising contacting said feed at catalytic cracking conditions with a catalyst composition comprising a zeolitic crystalline aluminosilicate, sepiolite and matrix material, characterized in that the sepiolite is present in non-dispersed form.

13 Claims, No Drawings

FLUID CRACKING PROCESS USING SEPIOLITE-CONTAINING CATALYST COMPOSITION

BACKGROUND OF THE INVENTION

The present invention relates to a process for cracking metal-containing feeds in the presence of a fluid cracking catalyst composition comprising a zeolitic crystalline aluminosilicate, sepiolite and a matrix material. A catalyst composition of the type indicated above is disclosed in U.S. Pat. No. 4,266,672, wherein it is stated that the presence of the sepiolite permits obtaining a catalyst which not only provides excellent cracking, but also outstandingly good demetallization, particularly of heavy feeds such as petroleum residua.

Sepiolite is a mineral which is often in the form of rods of lath-shaped or fibrous, hydrated magnesium silicate ($Mg_2Si_3O_8 2H_2O$). A description of sepiolite is found in the books Clay Mineralogy, R. E. Grim, McGraw-Hill (2nd Ed 1968), and The Electron-Optical Investigation of Clays, J. A. Gard, Ed., published by Mineralogical Society (1971). The sepiolite usually occurs in the form of bundles of generally parallelly oriented rods. In the above-mentioned patent it is stated that in order to make the sepiolite suitable for use in the cracking catalyst, the mineral must be broken up so that the sepiolite rods are disconnected. Each sepiolite rod should therefore be freely movable with respect to other rods. Dispersal or fibrillation of the rods can be accomplished by intensive grinding, kneading and the like. These treatments are, of course, time consuming and costly.

SUMMARY OF THE INVENTION

It has been found that in cracking and demetallizing metal-containing feeds, equivalent and even better results may be obtained using a fluid cracking catalyst composition comprising a zeolitic, crystalline aluminosilicate, sepiolite and a matrix material, characterized in that the sepiolite is present in non-dispersed form. This is particularly surprising in that in view of U.S. Pat. No. 4,266,672, the opposite was to be expected.

The present invention thus provides a process for cracking a metal-containing feed in the presence of a fluid cracking catalyst composition comprising contacting said feed at catalytic cracking conditions with a catalyst composition comprising a zeolitic, crystalline aluminosilicate, sepiolite and a matrix material, characterized in that the sepiolite is present in non-dispersed form.

As used herein the term non-dispersed means that the sepiolite rods are so associated with each other that the rods are not freely movable with respect to other rods.

DETAILED DESCRIPTION OF THE PREFERRED EMBODIMENTS

The present invention permits adding the sepiolite directly to a suspension, gel slurry or sol of one or more of the catalyst components. Alternatively, the sepiolite may first be formed into an (acid) aqueous suspension and thus be added to one or more other components.

Another procedure consists in pulverizing the generally coarse sepiolite powder. Typical however, is that in all pretreatments of the sepiolite and processing steps of the catalyst care is taken to prevent a sepiolite from being present in the catalyst composition in the dispersed state.

It should be noted that U.S. Pat. Nos. 3,210,267, 3,271,418, and 3,609,103 disclose the incorporation of sepiolite into cracking catalysts. In all these patent specifications sepiolite is included in a long list of clays applicable in cracking catalysts. None of these disclosures express any preference to the use of sepiolite, let alone mention that sepiolite-containing cracking catalysts have an excellent demetallizing effect and resistance to metals and after regeneration still display outstanding cracking activity.

As zeolitic crystalline aluminosilicate may be used all molecular sieves commonly employed for cracking catalysts. It is preferred that use should be made of synthetic crystalline aluminosilicate having a pore diameter in the range of 3 to 15 angstroms. Examples thereof include the zeolites A, X, Y, ZK-4, ZK-5, ZSM-5, ZSM-11 and ZSM-12 and ultrastable zeolites. It is preferred that zeolites of the types X and Y or ultrastable sieves should be used.

To ensure proper catalyst activity, the cations of the zeolites, which are often prepared in the sodium form, need to be exchanged. For this ion exchange use is generally made of solutions containing rare earth metal ions and/or ammonium or hydrogen ions. The exchange is as a rule carried on to such a level that the ready catalyst contains less than 4% by weight, preferably less than 1% by weight of sodium.

As matrix (binder) material can be used all well-known matrix materials suitable for embedding zeolitic crystalline aluminosilicates, such as silica, alumina, magnesia, zirconia, titania, boria, chlorohydrol and mixtures thereof. Preference is given to silica-alumina and alumina.

In addition to the sepiolite and the alumino silicate, other components may be incorporated into the matrix material. As examples thereof may be mentioned clays such as kaolin, bentonite, layered clays discussed in U.S. Pat. Nos. 3,252,757, 3,252,889 and 3,743,594, montmorilonite clays, and the like.

Furthermore alumina particles (aluminium hydrates and/or oxides) may be incorporated into the catalyst composition. Moreover, the catalyst composition may contain usual amounts of one or more passivators such as antimony, tin, and the like, which particularly serve to prevent excessive formation of hydrogen during the cracking process.

To reduce $SO_x$ emission and to promote the conversion of $CO/CO_2$, about 0.05 to about 1000 ppm of an oxidation promoting metal or metal compound may be incorporated into the present composition. Suitable for that purpose are noble metals or compounds thereof of group VIII of the periodic system, such as Pt, Pd, Ir, Rh, Os and Ru. Also suitable to that end are rare earth metals or compounds thereof. Examples of suitable oxidation promoters also include Cr and Cu, and compounds thereof. It is preferred that use should be made of about 0.1 to about 100 ppm, more particularly about 0.1 to about 50 ppm, of a noble metal of group VIII. Most preference is given to the incorporation into the catalyst of about 0.1 to about 10 ppm of platinum or palladium. These metals may be incorporated in the catalyst in a known manner, for instance by impregnation with a corresponding salt solution. For $SO_x$ adsorption and $CO/CO_2$ conversion, if desired, the presence of the oxidation promoter is indispensable.

The components of the catalyst composition may be combined with the matrix material in a manner known in itself. Suitable methods of preparation are described, among other places, in U.S. Pat. Nos. 3,609,103 and 3,676,330. For instance, the sepiolite and the aluminosilicate may be combined with the matrix material when the latter material is already in the gelled state. After proper mixing and subsequent spray drying the ready catalyst composition is obtained. Alternatively, the various components may be added to a matrix material in the form of a sol. This sol bonding agent can be formed into a gel before or during spray drying. The latter procedure is to be preferred. Thus, by combining non-dispersed sepiolite with a bonding agent which was non-gelled prior to spray drying it is possible to obtain catalyst compositions having a relatively high density. Thus, apparent densities higher than about 0.5 g/ml, preferably higher than about 0.60 g/l are simple to realize.

A suitable catalyst composition according to the present invention comprises about 5 to about 50, preferably about 10 to about 30 percent by weight of a zeolitic crystalline aluminosilicate and about 5 to about 70, preferably about 20 to about 50 percent by weight of non-dispersed sepiolite, which two components are embedded in about 10 to about 90 percent by weight of one and the same matrix material. It is preferred that the aluminosilicate should consist of a type Y zeolite exchanged for rare earth metal ions and/or ammonium or hydrogen ions. As matrix (binder) material there is preferably used a silica, silica-alumina or alumina formed into a gel by spray drying the total compositions. Particularly in uses requiring a reduction of $SO_x$ emission it is preferred that into the catalyst composition there should be incorporated about 0.1 to about 10 ppm of platinum.

Although the previously described catalyst composition of the present invention appears to provide good cracking and a satisfactory demetallization and metal resistance, it has been found that at high regeneration temperatures (i.e. above 750° C.) the crystallinity of the aluminosilicate is somewhat affected by the sepiolite. As a result, the activity of the regenerated catalyst composition will decrease. This phenomenon is probably related to migration to the zeolite of the magnesium present in sepiolite. The problem may to some extent be solved by subjecting the sepiolite to an ion exchange with $NH_4^+$ or $H^+$-containing solutions, before or after it is embedded in matrix material. Thus more than about 10%, preferably more than about 25%, most preferably more than about 50% of the magnesium originally present may be exchanged for the ions that do not adversely affect the zeolite.

To prevent the adverse effects of the above-mentioned migration, however, preference is given to using as the catalyst composition a physical mixture of:

a. catalytically more active particles comprising a zeolitic crystalline aluminosilicate and matrix material, and b. catalytically less active particles comprising non-dispersed sepiolite and matrix material.

By such physical separation of the two components the sepiolite is prevented from having any adverse effect on the crystallinity of the aluminosilicate. The two types of particles of different catalytic activity may be intermixed before they are charged into the reactor. Alternatively, the catalytically less active particles may be added separately to catalysts already present in the reactor.

The final mixture generally consists of about 10 to about 90, preferably about 30 to about 70 percent by weight of said catalytically active particles and about 90 to about 10, preferably about 70 to about 30 percent by weight of said catalytically less active particles. The composition of the total mixture is generally between the aforementioned limits. Very suitable is a physical mixture in which:

a. the catalytically more active particles contain about 10 to about 80, preferably about 20 to about 50 percent by weight of zeolitic crystalline aluminosilicate, about 5 to about 60, preferably about 20 to about 50 percent by weight of clay and about 5 to about 85, preferably about 10 to about 30 percent by weight of silica, silica-alumina or alumina, and b. the catalytically less active particles contain about 10 to about 80, preferably about 20 to about 60 percent by weight of non-dispersed sepiolite, and about 10 to about 90, preferably about 10 to about 30 percent by weight of silica or silica-alumina and, optionally, about 10 to about 30 percent by weight of clay.

Also in such a mixture the silica, silica-alumina or alumina in the catalytically active and/or less active particles preferably consists of silica, silica-alumina or alumina formed into a gel by spray drying the respective particles. A further advantage to the present mixtures is that their composition can be readily adapted to the use envisaged.

Thus, it is possible to compose mixtures in which the catalytically active particles are microporous (i.e. more than 40% of their pore volume in pores having a diameter smaller than 150 Angstroms) and the catalytically less active particles are macroporous (i.e. more than 40% of their pore volume in pores having a diameter greater than 150 Angstroms).

If augmentation of the octane number of petrol fractions is envisaged, then alumina particles (aluminium hydrates and/or oxides) may be incorporated into the catalytically active and/or less active particles in an amount of up to in all about 50, preferably about 25, more preferably about 1 to about 15 percent by weight of alumina particles.

It is also possible for the two different types of particles to have different diameters. For instance, the catalytically active particles may have a diameter of about 80 to about 125 microns and the catalytically less active particles a diameter of about 30 to about 75 microns.

Moreover, into one or more the two components of the mixture a noble metal of group VIII of the periodic system may be incorporated in a concentration of about 0.1 to about 100 ppm, preferably about 0.1 to about 50 ppm, calculated on the weight of the total mixture. It is again preferred then that the platinum should be used in an amount of about 0.1 to about 10 ppm.

Instead of bringing the feed into contact with a physical mixture of the above-mentioned particles it may first be contacted with the catalytically less active and subsequently with the catalytically more active particles.

The present catalyst composition is suitable for use in a conventional process for cracking metal-containing feeds. Catalytic cracking is normally carried out by contacting the feed with the catalyst composition at catalytic cracking conditions such as at a temperature of about 375° to about 650° C., more particularly about 460° to about 560° C. The pressure applied is generally in the range from about atmospheric to about 7 atmospheres, more particularly from about 1 to about 3 atmospheres. Regeneration with air is generally carried out at about 540° to about 825° C., more particularly, about 750° to about 800° C.

The present catalytic composition may be applied in the cracking of metal-containing feeds. The composition is particularly suitable for feeds having a final boiling point higher than about 480° C., a density greater than about 900 kg/m³, a metal content (Ni and V) of more than about 1 ppm and a Conradson carbon of more than about 1%. The present catalyst composition is preferably applied to heavier feeds, such as residua that include a substantial concentration of metals and/or asphaltenes.

A process in which the feed is first contacted with the catalytically less active sepiolite-containing particles and subsequently with the catalytically more active zeolite-containing particles is to be preferred particularly in the case of very heavy residual feeds. Thus the feed is demetallized before the actual cracking process.

activity of the catalyst. The results are listed in the accompanying Table. The present catalyst shows a better metal resistance and after steaming at 795° C. a better conversion than the corresponding catalyst containing a dispersed sepiolite.

TABLE

| | Catalyst Composition | | | | | | | |
|---|---|---|---|---|---|---|---|---|
| | | | | | | | VII (mixture) | |
| Components | I | II | III | IV | V | VI | 50% | 50% |
| RE NH₄Y-sieve (in %*) | 25 | 25 | 25 | 25 | 15 | 15 | — | 40 |
| sepiolite (in %) | | | | | | | | |
| non-dispersed | 20 | — | 20 | 30 | 20 | 20 | 60 | — |
| dispersed | — | 20 | | | | | | |
| kaolin (in %) | 35 | 35 | 35 | 30 | 25 | 45 | 20 | 35 |
| silica-alumina (97%/3%) | 20 | 20 | 20 | 20 | 20 | 20 | 20 | 20 |
| alumina particles (in %) | — | — | — | — | 20 | — | — | 5 |
| platinum (in ppm) | — | — | 5 | | | | | |
| SA (m²/g) | 180 | 190 | 227 | 178 | 182 | 135 | 128 | 246 |
| PV$_{H_2O}$ (ml/g) | 0.28 | 0.28 | 0.32 | 0.32 | 0.29 | 0.28 | 0.33 | 0.30 |
| ABD (600 g; g/ml) | 0.78 | 0.78 | 0.76 | 0.76 | 0.66 | 0.80 | 0.66 | 0.79 |
| Na₂O (in %) | 0.44 | 0.47 | 0.43 | 0.33 | 0.29 | 0.21 | 0.06 | 0.77 |
| Crystallinity fresh (%) | 23.5 | 24.7 | 24.7 | 16.5 | 12.1 | 13.3 | | 34.7 |
| Test Results | | | | | | | | |
| NAT-795° C.-test | | | | | | | | |
| K | 13.8 | 9.6 | — | 13.3 | 14.5 | 13.0 | | 19.3 |
| Conversion | 53.5 | 44.5 | — | 52.6 | 54.7 | 52.0 | | 61.5 |
| Gas Total % | 10.3 | 7.7 | — | 10.1 | 10.6 | 9.5 | | 13.1 |
| Gasoline % | 40.2 | 34.5 | — | 40.1 | 41.1 | 40.3 | | 44.6 |
| LCO | 23.1 | 23.1 | — | 23.8 | 24.8 | 23.7 | | 22.2 |
| Coke | 2.66 | 1.71 | — | 2.5 | 3.1 | 2.22 | | 3.90 |
| MAT MR-test | | | | | | | | |
| V (in ppm) | 2670 | 2590 | 3170 | 3350 | 3070 | 3225 | | 3020 |
| Ni (in ppm) | 890 | 905 | 940 | 1080 | 1057 | 1266 | | 1000 |
| K | 24.9 | 21.6 | 26.4 | 22.6 | 21.1 | 18.2 | | 26.9 |
| Conversion | 67.3 | 64.2 | 68.8 | 65.3 | 63.7 | 60.1 | | 69.1 |
| Gas total % | 15.1 | 14.3 | 15.1 | 13.5 | 12.4 | 11.5 | | 15.0 |
| Gasoline | 44.1 | 43.0 | 44.2 | 44.5 | 43.5 | 43.4 | | 45.4 |
| LCO | 19.2 | 19.6 | 18.5 | 20.8 | 22.4 | 23.2 | | 19.6 |
| Coke | 8.1 | 7.0 | 9.5 | 7.3 | 7.8 | 5.2 | | 8.7 |

*percentages are % by weight

EXAMPLES

The catalyst compositions mentioned in the Table are obtained by adding the various components to an acid silica-alumina sol, which total composition is fed through a colloid mill and gelled by spray drying. Accordingly, the catalytically active and less active particles of the physical mixture, mentioned in this Table, are prepared.

Catalyst II is a control composition containing dispersed sepiolite. For dispersion a suspension of sepiolite was pulverized to a very high degree in a Dynamill before adding the sepiolite to the other components.

The catalysts were tested for metal resistance, activity, and selectivity, use being made of the MR and MAT test methods as described in the book (pp. FCC/80-84) on the Ketjen symposium at Amsterdam (The Netherlands) from 25-30 May 1982. The K-value (reaction rate constant) and the conversion are parameters for the

I claim:

1. A process for fluid catalytic cracking metal-containing petrolum feed in the presence of a fluid cracking catalyst comprising contacting the feed at fluid catalytic cracking conditions with a catalyst comprising a zeolitic crystalline aluminosilicate, sepiolite and a martix material, wherein the sepiolite is present in non-dispersed form.

2. A process according to claim 1, wherein the cracking catalyst comprises about 5 to about 50 percent by weight of said zeolitic crystalline aluminosilicate and about 5 to about 70 percent by weight of said non-dispersed sepiolite, which two components are embedded in about 10 to about 90 percent by weight of one and the same matrix material.

3. A process according to claim 2, wherein the cracking catalyst contains as matrix material a silica, silica-alumina or alumina formed into a gel by spray drying the composition.

4. A process according to claim 3, wherein the cracking catalyst contains about 0.1 to about 10 ppm of platinum.

5. A process according to claim 1, wherein the cracking catalyst comprises:
   a. catalytically active particles comprising a zeolitic crystalline aluminosilicate and matrix material, and
   b. catalytically less active particles comprising non-dispersed sepiolite and matrix material.

6. A process according to claim 5, wherein the cracking catalyst contains about 10 to about 90 percent by weight of the catalytically active particles and about 90 to about 10 percent by weight of the catalytically less active particles.

7. A process according to claim 6, wherein
a. the catalytically active particles contain about 10 to about 80 percent by weight of zeolitic crystalline aluminosilicate, about 5 to about 60 percent by weight of clay and about 5 to about 85 percent by weight of silica, silica-alumina or alumina, and
b. the catalytically less active particles contain about 10 to about 80 percent by weight of non-dispersed sepiolite, and about 10 to about 90 percent by weight of silica or silica-alumina.

8. A process according to claim 7, wherein the silica, silica-alumina or alumina in at least one of the catalytically active and less active particles is formed into a gel by spray drying the respective particles.

9. A process according to claim 8, wherein the active and less active particles contain up to about 25 percent by weight of alumina particles.

10. A process according to claim 9, wherein at least one of the catalytically active and less active particles contain about 0.1 to about 10 ppm of platinum.

11. A process according to claim 5, wherein the metal-containing feed is first contacted with the catalytically less active particles and subsequently with the catalytically active particles.

12. A process according to claim 10, wherein the metal-containing feed is first contacted with the catalytically less active particles and subsequently with the catalytically active particles.

13. A process according to claim 6, wherein
a. the catalytically active particles contain about 10 to about 80 percent by weight of zeolite crystalline aluminosilicate, about 5 to about 60 percent by weight of clay and about 5 to about 85 percent by weight of silica, silica-alumina or alumina, and
b. the catalytically less active particles contain about 10 to about 80 percent by weight of non-dispersed sepiolite, about 10 to about 90 percent by weight of silica or silica-alumina, and about 10 to about 50 percent by weight of clay.

* * * * *